INVENTOR.
DANIEL P. MOONEY

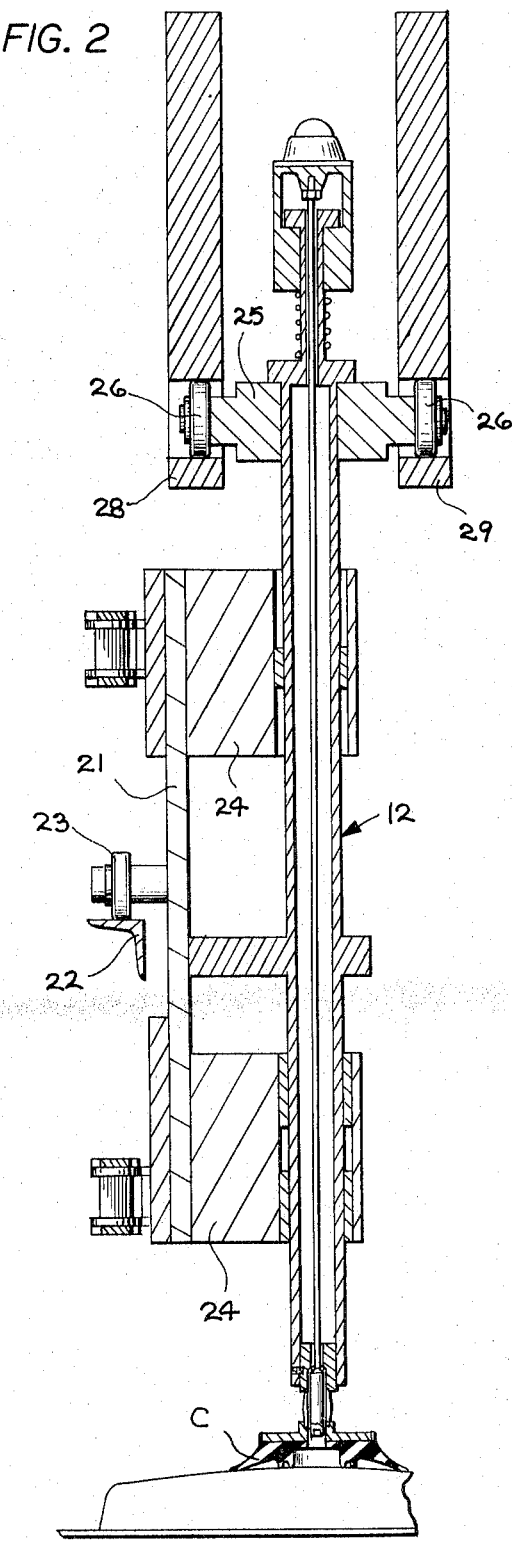
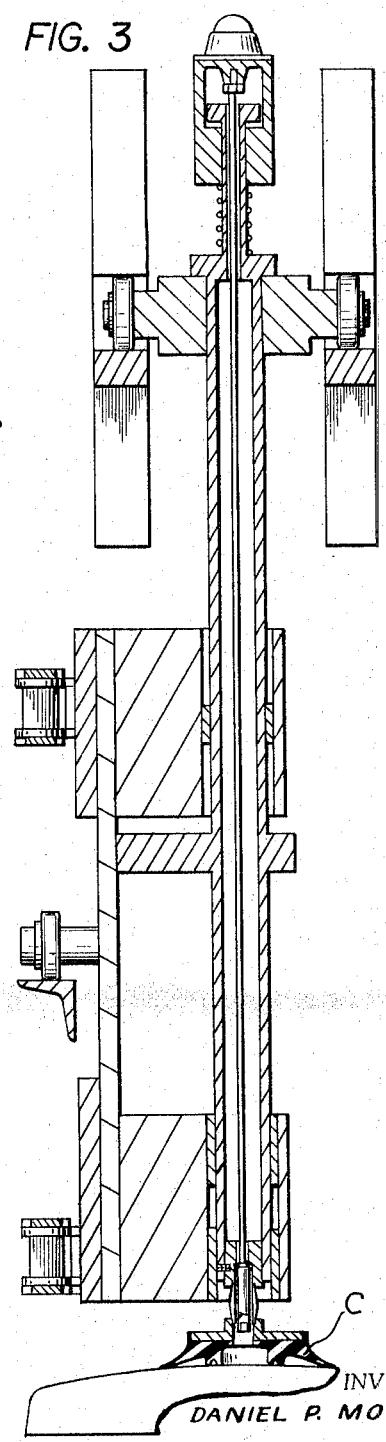

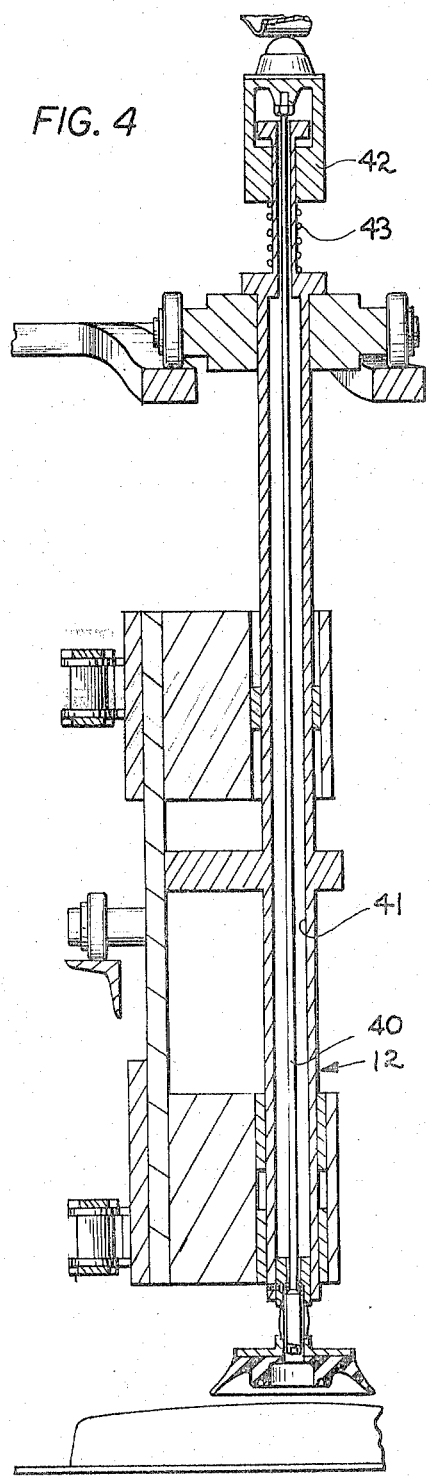
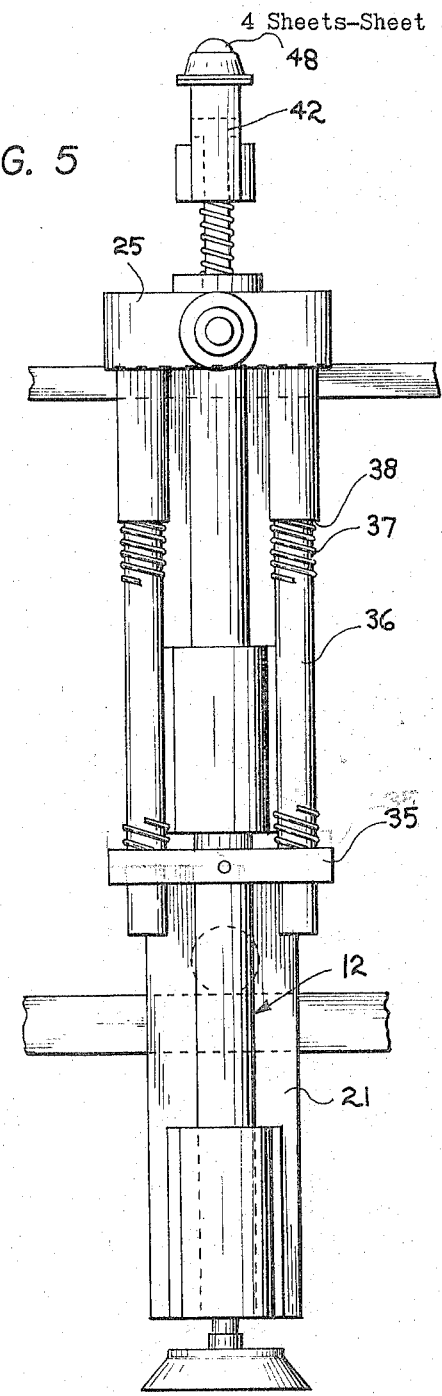

United States Patent Office 3,302,803
Patented Feb. 7, 1967

3,302,803
ARTICLE HANDLING AND TRANSFER DEVICE
Daniel P. Mooney, New Lexington, Ohio, assignor to Owens-Illinois, Inc., a corporation of Ohio
Filed Nov. 12, 1964, Ser. No. 410,544
20 Claims. (Cl. 214—1)

This invention relates to article handling devices and particularly to article handling devices for transferring articles from work holders on one conveyor to a second conveyor which is angularly displaced from the first conveyor.

In handling of articles, such as the face plates of television tubes, which comprise a generally flat viewing portion and a peripheral flange portion, it is customary in one or more processes to support the face plate on work holders on endless conveyors. In order to remove the face plates for subsequent operations, it is necessary to lift each face plate and then position it on another conveyor or at another work area for subsequent operations.

It is therefore an object of this invention to provide an apparatus for lifting and transferring articles from work holders on an endless conveyor in synchronism with the movement of the endless conveyor and positioning the articles at a remote position and at predetermined time intervals as may be desired.

It is a further object of the invention to provide such an apparatus which is simple and inexpensive.

It is a further object of the invention to provide such an apparatus which requires a minimum of maintenance.

Basically, the invention comprises providing a plurality of spindles which are driven in synchronism with a first endless conveyor and are movable in a path a portion of which is along the first conveyor. Each spindle is provided with a vacuum cup having a chamber so that when the spindle is moved into engagement with the article a vacuum is created and when the spindle is raised away from the conveyor the article is lifted from the support on the conveyor. Means are then provided along a further point in the path of the spindles for venting the vacuum created in each cup and releasing the article onto another conveyor or onto another work area.

In the drawings:

FIG. 2 is a sectional view on an enlarged scale similar to FIG. 3 showing an individual spindle of the apparatus in a loading position.

FIG. 3 is a sectional view on an enlarged scale taken along the line 3—3 in FIG. 1.

FIG. 4 is a sectional view on an enlarged scale similar to FIG. 3 showing an individual spindle in an unloading position.

FIG. 5 is a fragmentary front elevational view of a portion of the apparatus shown in FIG. 1.

Figure 1:
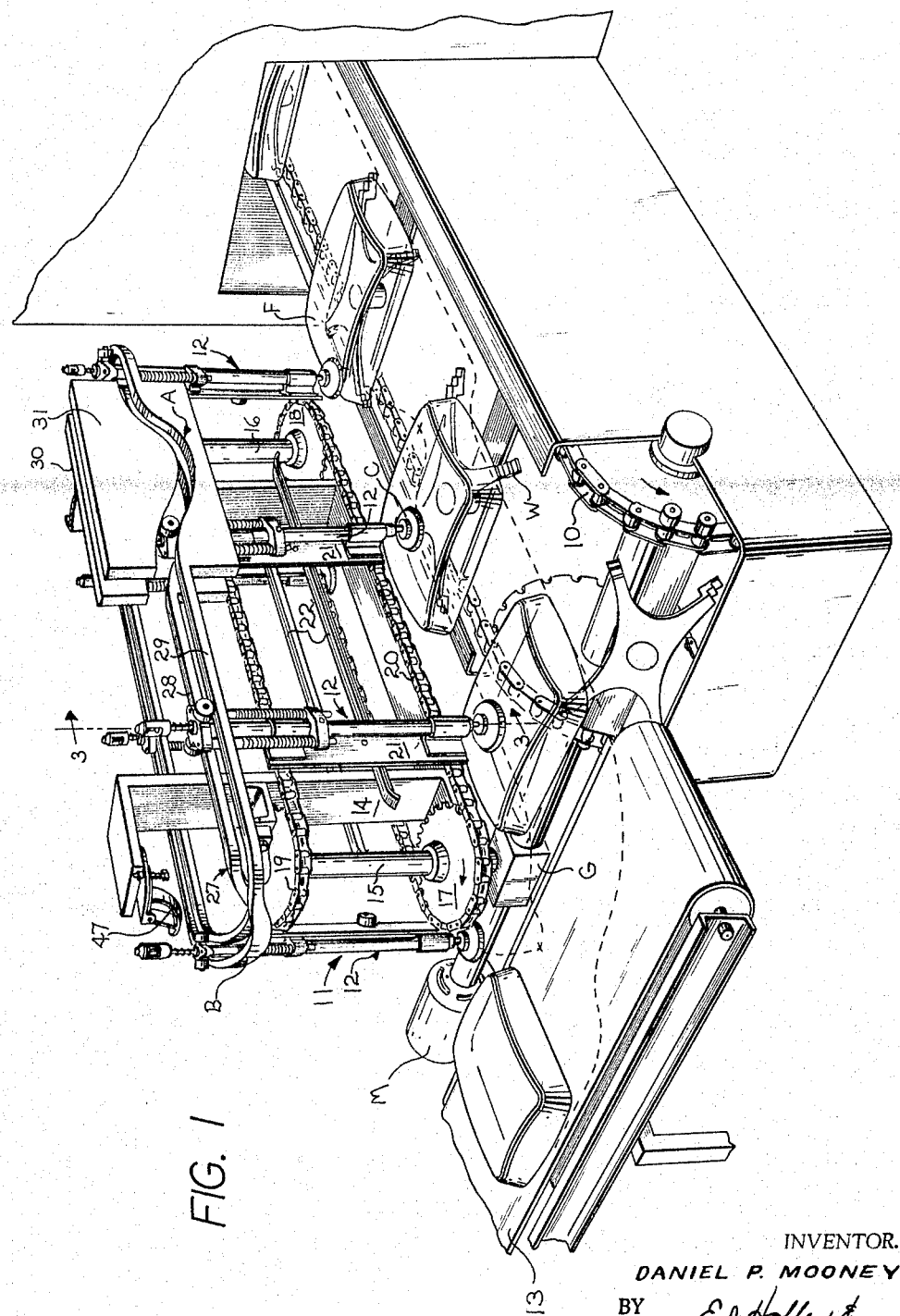
FIG. 1 is a fragmentary perspective view of an apparatus embodying the invention.

Referring to FIG. 1, the apparatus embodying the invention comprises a transfer device 11 which is adapted to lift articles such as the face plates F of television tubes from work holders W at longitudinally spaced points on an endless conveyor 10 and transfer the face plates F to an endless conveyor 13 extending at an angle to the conveyor 10. As shown in FIG. 1, each face plate comprises a generally flat viewing portion which engages the work holder W and a peripheral flange which surrounds the work holder W. The conveyor 10 may remove the face plates F from prior operations such as a polishing step and the articles F can be wet or dry.

As further shown in FIG. 1, the transfer device 11 includes a plurality of vertical spindles 12 which are moved in an endless path and have flexible cups C on the lower ends thereof. Each cup C is formed with a space so that when the spindle 12 is moved downwardly and engages the viewing portion of the face plate F, a vacuum is created that tends to hold the face plate F on the spindle. When each spindle 12 is then elevated, the face plate F is moved vertically and thereby removed from the work holder W. Continued movement of the spindles 12 brings the face plate F into overlying relation with the endless conveyor 13 where vent means are actuated to release the vacuum in the cup C and permit the face plate F to fall a short distance onto the conveyor 13 and be carried away by the conveyor 13.

The transfer device 11 includes a pair of spaced vertical shafts 15, 16 which have vertically spaced sprockets 17, 18 thereon. Endless chains 19, 20 are trained over the sprockets 17, 18. The chains 19, 20 are driven in synchronism with the conveyor 10 by a gear box G driven by a motor M and forming a driving connection between the conveyor 10 and shaft 15.

Each of the spindles 12 is mounted on a flight plate 21 extending at spaced points vertically between the chains 19, 20. In the long reaches of the chains 19, 20 between the sprockets 17, 18, the plates 21 and the chains are supported by guides 22 which are engaged by rollers 23 on the plates 21 (FIG. 2).

As shown in FIG. 2, vertically spaced brackets 24 are provided on each plate 21 and each spindle 12 is mounted for vertical movement therein. The upper end of each spindle 12 is formed with a head 25 having spaced rollers 26 thereon that engage a continuous cam track 27 overlying the chains 19, 20. The cam track 27 comprises spaced sections 28, 29. As shown in FIG. 1, a portion of the reach of the chains 19, 20 extends along the conveyor 10. In this portion of the reach, the cam track 27 gradually dips as at A and then gradually rises. An upper cam comprising spaced sections 30, 31 overlies the depressed portion A and guides the downward and upward movement of the spindle 12.

Figure 6:
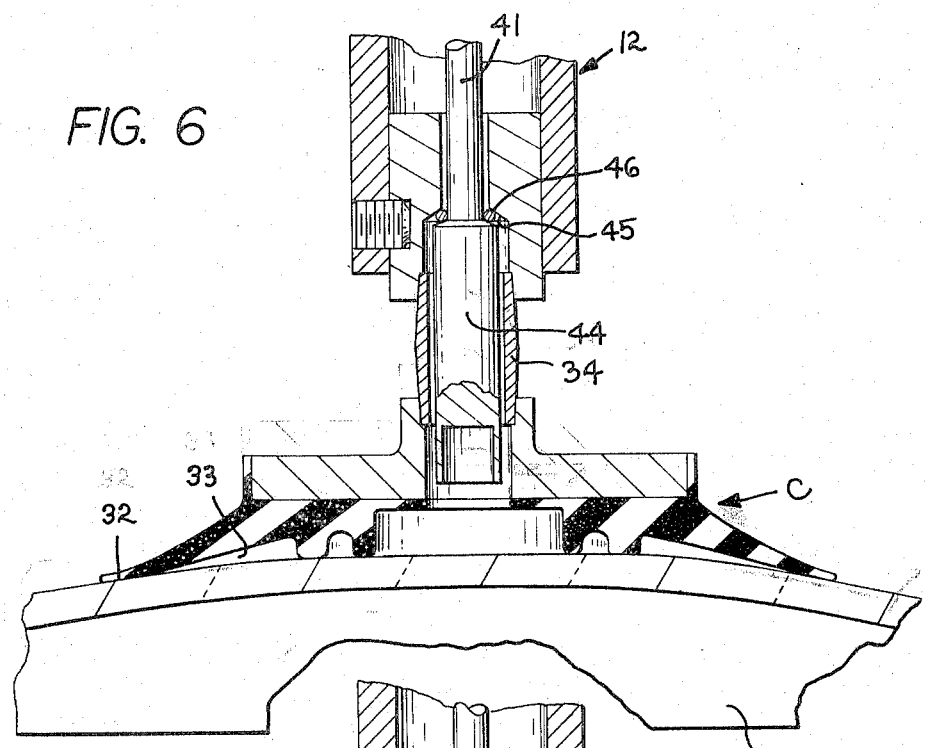
FIG. 6 is a fragmentary sectional view on an enlarged scale of a portion of the apparatus shown in FIG. 2.

As shown in FIG. 6, the flexible cup C on each spindle comprises a peripheral flexible flange 32 which defines a chamber 33. When the spindle 12 is moved downwardly into contact with the viewing portion of the face plate F, the flange 32 is flexed and air is expelled from the chamber 33 creating a vacuum tending to retain the face plate F on the cup C so that when the spindle is elevated, the face plate F is elevated. As shown in FIG. 6, the cup C is mounted on the lower end of the spindle by a sleeve 34.

As shown in FIG. 5, guide means are provided for preventing relative rotation of the spindle 12 with respect to the flight plate 21 and comprises a guide plate 35 fixed on the spindle intermediate its ends and guide rods 36 extending downwardly from the spindle head 25 through openings in the guide plate 35. Springs 37 are interposed between shoulders 38 on the guide rods 36 and the guide plates 35. This tends to prevent rotation between the spindle 12 and a flight plate 21.

In order to provide for release of the vacuum in the cup C when the face plate F is brought into position over the conveyor 13, venting means is provided and includes a rod 40 which extends upwardly through the hollow passage 41 in the spindle 12. As shown in FIG. 4, a head 42 is provided on the upper end of the rod 40 which projects upwardly through the upper end of the spindle 12 and a spring 43 is interposed between the head 42 and the upper end of the spindle 12 yieldingly urging the rod 40 upwardly.

As shown in FIG. 6, the lower end 44 of rod 40 is enlarged and is adapted to provide a seal with a seat 45 in the lower end of the spindle 12. An O-ring 46 is provided to insure a proper seal. Thus, in the normal position of the rod 40 wherein it is yieldingly urged upwardly by spring 43, the rod 40 cuts off communication between the chamber 33 of cup C and the hollow chamber 41 of spindle 12.

Figure 7:
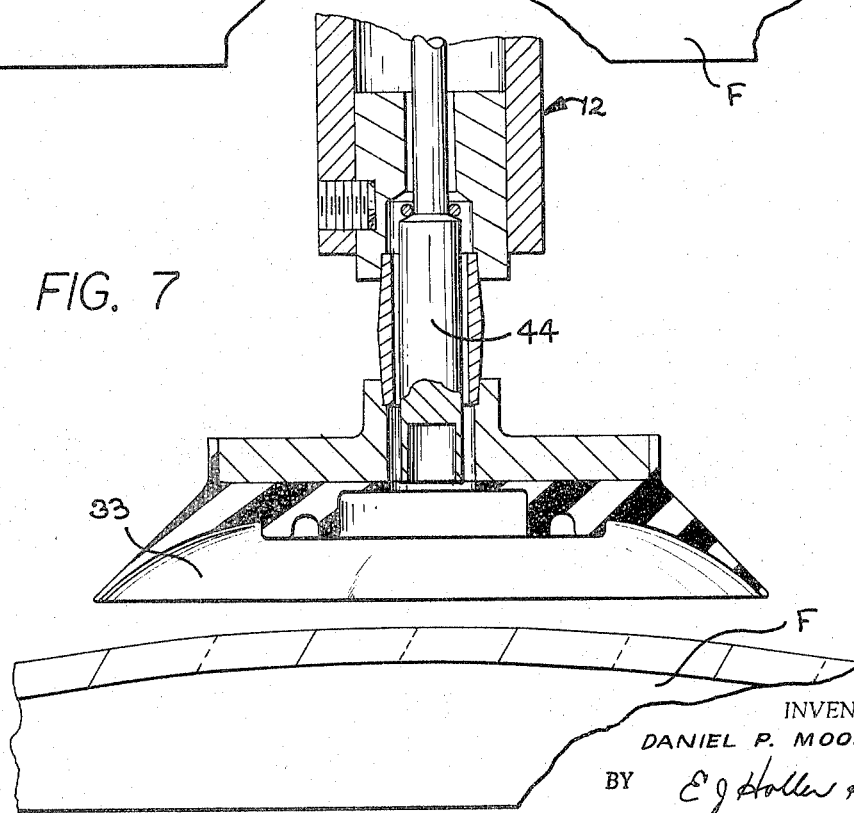
FIG. 7 is a fragmentary sectional view similar to FIG. 6 showing the parts in a different operative position.

As shown in FIG. 1, a cam plate 47 is provided in overlying relation to the conveyor 13 so that when a spindle reaches this position, the cam plate 47 engages a hemispherical knob 48 on the head 42 of the rod 40 to depress the rod and move the enlarged end 44 thereof downwardly as shown in FIG. 7 thereby venting the space 33 to the atmosphere through the interior 41 of hollow spindle 12 to break the vacuum and permit the article F to fall onto the conveyor 13.

As shown in FIG. 7, in order that the article F will not fall a very great distance, a portion B of the cam track 27 has a slight dip therein to move the article adjacent the conveyor 13 before it is released.

I claim:

1. The combination comprising
    a first endless conveyor having spaced work holders thereon for moving articles in a predetermined path,
    a second endless conveyor adjacent to said first endless conveyor and angularly related thereto,
    and transfer means adjacent said conveyors comprising a plurality of spindles,
    means for moving said spindles in an endless path a portion of which is adjacent said first conveyor and another portion of which is adjacent said second conveyor,
    each said spindle having a flexible cup thereon formed with a chamber surrounded by a flexible annular flange which is adapted to engage an article on a work holder on the first conveyor,
    means in the portion of the path of said spindles adjacent said first conveyor for moving said spindles successively toward said first conveyor in timed relation to the movement of said first conveyor so that the flange of the cup on the end of the spindle engages an article on a work holder on said first conveyor and air is expelled from the chamber of the cup creating a vacuum to support the article on the spindle,
    means for raising each spindle after engagement with an article for elevating the spindle and the article supported thereby to remove the article from the work holder,
    and means adjacent said other portion of the path of the spindles when they are adjacent said second conveyor for venting the chamber of the cup on each spindle and thereby releasing the article from the spindle for removal by said second conveyor.

2. The combination set forth in claim 1 wherein each said spindle is hollow,
    said means for venting the chamber of each said cup comprising a rod in said hollow spindle with sealing means thereon,
    said rod providing in one position thereof communication between the interior of said hollow spindle and said cup and in another position thereof sealing the interior of said hollow spindle from said cup,
    the upper end of said rod remote from said cup projecting upwardly,
    and cam means along the other portion of the path of said spindles when they are adjacent said second conveyor for engaging the upper end of said rod and moving said rod to said one position and thereby venting the vacuum from said cup to release said article from said spindles.

3. The combination set forth in claim 1 wherein said means for moving said spindles toward and away from said first conveyor comprises
    a cam track mounted adjacent said first conveyor,
    and cam follower means on said spindles engaging said cam track.

4. The combination comprising
    a first horizontal conveyor having spaced work holders thereon for carrying articles horizontally in a predetermined path,
    a second conveyor adjacent said first conveyor and angularly related thereto for moving articles in an angular direction,
    and transfer means for removing articles from the work holders of said first conveyor and depositing on said second conveyor comprising
    endless means mounted for movement about vertical axes and having a first reach thereof extending parallel to said first conveyor and second reach thereof extending adjacent said second conveyor,
    means for driving said endless means in synchronism with said first conveyor,
    a plurality of vertical spindles mounted at spaced points on said endless means,
    each said spindle being adapted for vertical movement toward and away from said first conveyor as the spindle is moved along said conveyor,
    means for moving each said spindle toward and away from said first conveyor as it moves along adjacent said first conveyor,
    a resilient cup on the lower end of each spindle having a chamber therein surrounded by a flexible annular flange whereby when the spindle is moved downwardly onto an article on the first conveyor the flange engages the article, air is expelled from the chamber and a vacuum is created so that when the spindle is raised the article is removed from the work holder on the first conveyor,
    valve means adapted to vent each cup,
    and means adjacent said second reach of said endless means adjacent said second conveyor for actuating said valve means to vent the chamber of the cup and thereby permit the release of the article onto the second conveyor.

5. The combination set forth in claim 4 wherein said valve means comprises
    a rod,
    each said spindle being hollow with said rod extending therethrough,
    sealing means adjacent the lower end of said rod adapted to provide a seal when the rod is in upper position,
    means yieldingly urging the rod upwardly,
    and means adjacent said second conveyor for engaging the rod and moving it downwardly to vent the cup.

6. The combination comprising
    a first endless horizontal conveyor having work holders thereon for moving articles in a predetermined horizontal path,
    a second endless conveyor adjacent and angularly related to said first conveyor,
    and transfer means for vertically removing an article from a work holder on said first conveyor and moving it and depositing it on said second conveyor comprising
    spaced vertical shafts mounted for rotation adjacent said first conveyor,
    vertically spaced sprockets on each said shaft,
    means for rotating said shafts in synchronism with said first conveyor,
    a pair of chains trained over said sprockets,
    and a plurality of spindle assemblies mounted at longitudinally spaced points along said chains,
    one reach of said chain extending along said first conveyor,
    one set of said sprockets being positioned adjacent said second conveyor,
    each said spindle assembly comprising a vertically movable spindle having a flexible cup on the lower end thereof with a hollow chamber therein surrounded by a flexible annular flange, means along said one reach adjacent said first conveyor for moving each spindle successively downwardly to cause said cup to engage an article and expel air from said chamber to create a vacuum in the chamber to support the article on the spindle and for lifting the article from the work holder on the first conveyor, and means adjacent said one set of sprockets for venting each said cup as the spindle reaches a position adjacent said sprockets in overlying relation to said second conveyor to thereby release the article onto said second conveyor.

7. The combination comprising
a first endless horizontal conveyor having work holders thereon for moving articles in a predetermined horizontal path,
a second endless conveyor adjacent and angularly related to said first conveyor,
and transfer means for vertically removing an article from a work holder on said first conveyor and moving it and depositing it on said second conveyor comprising
spaced vertical shafts mounted for rotation adjacent said first conveyor,
vertically spaced sprockets on each said shaft,
means for rotating said shafts in synchronism with said first conveyor,
a pair of chains trained over said sprockets,
and a plurality of spindle assemblies mounted at longitudinally spaced points along said chains,
one reach of said chain extending along said first conveyor,
one set of said sprockets being positioned adjacent said second conveyor,
each said spindle assembly comprising a vertically movable spindle having a flexible cup on the lower end thereof with a hollow chamber therein,
means along said one reach adjacent said first conveyor for moving each spindle successively downwardly to cause said cup to engage an article and lift the article from the work holder on the first conveyor due to a vacuum created in said hollow chamber of said cup,
and means adjacent said one set of sprockets for venting each said cup as the spindle reaches a position adjacent said sprockets in overlying relation to said second conveyor to thereby release the article onto said second conveyor,
each said spindle assembly comprising
a flight plate,
means for guiding said spindle for vertical movement comprising a pair of spaced brackets on each flight plate,
an endless cam track overlying the path of said chains,
each said spindle having a head on the upper end thereof engaging said cam track for guiding and controlling the vertical position of said spindles.

8. The combination set forth in claim 7 wherein said spindle head has roller bearing means thereon engaging said cam track.

9. The combination set forth in claim 7 wherein said cam track comprises spaced track sections.

10. The combination set forth in claim 7 wherein said means for raising and lowering said spindle adjacent said first conveyor comprises
a first depressed portion of said cam track,
and a second cam track spaced from and vertically overlying said first cam track and shaped in complementary fashion to said first cam track.

11. The combination set forth in claim 7 including means for preventing relative rotation between said spindle and said flight plate.

12. The combination set forth in claim 7 wherein said means for venting each said cup comprises a valve providing communication between the interior of said cup and the exterior,
and means overlying said second conveyor for actuating said valve.

13. The combination set forth in claim 12 wherein said valve includes a rod,
the interior of said spindle being hollow,
said rod extending within said spindle to a position exteriorly of the upper end of said spindle,
sealing means on the lower end of said rod for cutting off communication between the interior of said cup and the interior of said hollow spindle,
means yieldingly urging said rod upwardly,
and cam means overlying said second conveyor for engaging the upper end of the spindle and causing said rod to be moved downwardly and thereby provide communication between the interior of said cup and the interior of said hollow spindle to vent the interior of said cup and release the article.

14. In an apparatus for removing and transferring articles from an endless conveyor having spaced work holders thereon for moving articles in a predetermined path to another area, the combination comprising
a plurality of spindles,
means for moving said spindles in an endless path a portion of which is adapted to be adjacent said conveyor and another portion of which is adjacent said area,
each said spindle having a flexible cup thereon formed with a chamber surrounded by a flexible annular flange which is adapted to engage an article on a work holder on the conveyor,
means in the portion of the path of said spindles adjacent said conveyor for moving said spindles successively downwardly in timed relation so that the flange of the cup on the end of the spindle engages an article on a work holder on said conveyor and air is expelled from the chamber of the cup creating a vacuum to support the article on the spindle,
means for raising each spindle after engagement with an article for elevating the spindle and the article supported thereby to remove the article from the work holder,
and means adjacent said other portion of the path of the spindles for venting the cup on each spindle and thereby releasing the article from the spindle.

15. The combination set forth in claim 14 wherein each said spindle is hollow,
said means for venting the chamber of each said cup comprising a rod in said hollow spindle with sealing means thereon,
said rod providing in one position thereof communication between the interior of said hollow spindle and said cup and in another position thereof sealing the interior of said hollow spindle from said cup,
the upper end of said rod remote from said cup projecting upwardly,
and cam means along the other portions of the path of said spindles for engaging the upper end of said rod and thereby venting the vacuum from said cup to release said article from said spindles.

16. The combination set forth in claim 14 wherein said means for moving said spindles toward and away from said first conveyor comprises
a cam track mounted adjacent said first portion of the path of the spindles,
and cam follower means on said spindles engaging said cam track.

17. In an apparatus for removing and transferring articles from an endless conveyor having spaced work holders thereon for moving articles in a predetermined path to another area, the combination comprising
endless means mounted for movement about vertical axes and having a first reach thereof adapted to extend parallel to said conveyor and a second reach thereof extending adjacent said area, a plurality of spindles mounted at spaced points on said endless means, each of said spindles being adapted for vertical movement toward and away from said first conveyor as the spindle is moved along said conveyor, means for moving each said spindle transversely of the path of said endless means as it moves along said first reach of the path, a resilient cup on the lower end of each spindle having a chamber therein surrounded by a flexible annular flange whereby when the spindle is moved toward an article on said conveyor the flange engages the article, air is expelled from the chamber and a vacuum is created so that when the spindle is raised the article is removed from the work holder on the first conveyor, valve means on each said spindle adapted to vent each cup, and means adjacent said second reach of said endless means for actuating said valve means to vent the cup and thereby permit the release of the article.

18. The combination set forth in claim 17 wherein said valve means comprises a rod, each said spindle being hollow with said rod extending therethrough, sealing means adjacent the lower end of said rod adapted to provide a seal when the rod is in upper position, means yieldingly urging the rod upwardly, and means adjacent said second conveyor for engaging the rod and moving it downwardly to vent the cup.

19. In an apparatus for removing and transferring articles from an endless conveyor having spaced work holders thereon for moving articles in a predetermined path to another area, the combination comprising spaced vertical shafts mounted for rotation adjacent said first conveyor, vertically spaced sprockets on each said shafts, means for rotating said shafts in synchronism with said conveyor, a pair of chains trained over the sprockets, and a plurality of spindle assemblies mounted at longitudinally spaced points along said chains, each said spindle assembly comprising a spindle having a flexible cup on the lower end thereof with a hollow chamber therein surrounded by a flexible annular flange, an endless cam track overlying the path of said chains, said spindle having a head on the upper end thereof engaging said cam track, a portion of said cam track adjacent along one reach of said chains being depressed for moving each spindle successively downwardly to cause the flange of said cup to engage an article and expel air from said chamber to create a vacuum in the chamber to support the article on the spindle and for lifting the article from a work holder, and means for venting each said cup as the spindle reaches said sprockets to thereby release the article onto said second conveyor.

20. The combination set forth in claim 19 wherein said means for venting each said cup comprises a valve providing communication between the interior of said cup and the exterior, said valve including a rod, the interior of said spindle being hollow, said rod extending within said spindle to a position exteriorly of the upper end of said spindle, sealing means on the lower end of said rod for cutting off communication between the interior of said cup and the interior of said hollow spindle, means yieldingly urging said rod upwardly, and cam means adjacent said first set of sprockets for engaging the upper end of the spindle and causing said rod to be moved downwardly and thereby provide communication between the chamber of said cup and the interior of said hollow spindle to vent the chamber of said cup to release the article.

References Cited by the Examiner

UNITED STATES PATENTS

| | | | |
|---|---|---|---|
| 1,972,753 | 9/1934 | Bausman | 198—25 |
| 2,607,620 | 8/1952 | Oliveri | 294—64 |
| 2,611,493 | 8/1952 | Nordquist | 214—1 |
| 3,087,596 | 4/1963 | Fulton | 198—210 X |
| 3,125,228 | 3/1964 | Laidig | 214—1 |

FOREIGN PATENTS 621,679   6/1961   Canada.

MARVIN A. CHAMPION, *Primary Examiner.*